(12) United States Patent
Choo et al.

(10) Patent No.: US 8,026,987 B2
(45) Date of Patent: Sep. 27, 2011

(54) PANEL ASSEMBLY

(75) Inventors: Dae-Ho Choo, Seongnam-si (KR); Ho-Min Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 600 days.

(21) Appl. No.: 11/804,024

(22) Filed: May 15, 2007

(65) Prior Publication Data

US 2007/0268243 A1  Nov. 22, 2007

(30) Foreign Application Priority Data

May 16, 2006  (KR) ........................ 10-2006-0043732

(51) Int. Cl.
    *G02F 1/1335*  (2006.01)
(52) U.S. Cl. .......................................................... 349/12
(58) Field of Classification Search .................... 349/12; 345/173
    See application file for complete search history.

(56) References Cited

U.S. PATENT DOCUMENTS

| | | | |
|---|---|---|---|
| 5,818,550 A * | 10/1998 | Kadota et al. .................. 349/43 |
| 6,424,403 B1 * | 7/2002 | Leenhouts et al. ............ 349/199 |
| 6,488,981 B1 * | 12/2002 | Richter et al. .................. 427/58 |
| 6,909,425 B2 * | 6/2005 | Matsuda et al. .............. 345/173 |
| 7,268,770 B1 * | 9/2007 | Takahata et al. .............. 345/173 |
| 7,633,565 B2 * | 12/2009 | Matsumoto et al. ............ 349/12 |

FOREIGN PATENT DOCUMENTS

CN          1262756         8/2000

\* cited by examiner

*Primary Examiner* — Dung T. Nguyen
(74) *Attorney, Agent, or Firm* — Innovation Counsel LLP

(57) ABSTRACT

According to an embodiment of the present invention a panel assembly includes a first display panel having a first insulation substrate, a second display panel having a second insulation substrate opposite to the first insulation substrate, and a touch sensing unit formed on a surface of the second insulation substrate not facing the first insulation substrate. The touch sensing unit includes an electrostatic induction insulating layer formed on the second insulation substrate, an electrostatic induction pattern layer formed on the electrostatic induction insulating layer along edges of the electrostatic induction insulating layer, and a dielectric layer that covers the electrostatic induction insulating layer and the electrostatic induction pattern layer.

20 Claims, 18 Drawing Sheets

PANEL ASSEMBLY

CROSS-REFERENCE TO RELATED APPLICATION

This application claims priority to and the benefit of Korean Patent Application No. 10-2006-0043732 filed in the Korean Intellectual Property Office on May 16, 2006, the entire contents of which are incorporated herein by reference.

BACKGROUND OF THE INVENTION (a) Field of the Invention

The present invention relates to a panel assembly. More particularly, the present invention relates to a panel assembly having an input function.

(b) Description of the Related Art

In recent years, the demand for display devices such as liquid crystal displays (LCDs) has exploded as these display devices have become smaller and lighter and have increased in performance due to rapidly advancing semiconductor technology. Since LCDs have various advantages, including they are small and light and have low power consumption, LCDs have been drawing attention as a substitute display device that can overcome many of the drawbacks of cathode ray tubes (CRTs). As a result, the LCD may be used in almost all information processing apparatuses that require a display device. For example, the LCD is used in small-sized products such as mobile phones and PDAs (portable digital assistants) that need a display device, as well as medium-sized and large-sized products such as monitors and TVs. In a display device, a touch panel may additionally be attached to a display panel that displays images so that a user can easily use the display device. The touch panel allows the display panel, which has display and output functions, to additionally have an input function, which helps a user easily interact with the information processing apparatus to obtain specific information.

However, a conventional touch panel may be separately manufactured and then mounted on a front surface of the display panel. Therefore, in order to produce a display panel mounted with a touch panel, a problem may arise in that the overall manufacturing process may be complicated, and the productivity thereof is consequently lowered. Further, in the related art, since the touch panel is separately manufactured and is then mounted on the display panel, a problem occurs in that the resolution of the display panel deteriorates due to the touch panel. Furthermore, a problem occurs in that the image quality deteriorates due to degradation of optical characteristic of the touch panel. Still further, since an additional touch panel is mounted on the display panel, a problem occurs in that the display area of the display panel is reduced.

The above information disclosed in this Background section is only for enhancement of understanding of the background of the invention and therefore it may contain information that does not constitute prior art that is already known in this country to a person of ordinary skill in the art.

SUMMARY OF THE INVENTION

The present invention has been made in an effort to provide a panel assembly that is capable of providing an input function by which external signals are asserted or input, as well as a display function by which images are displayed. According to an embodiment of the present invention, a panel assembly includes a first display panel having a first insulation substrate, and a second display panel having a second insulation substrate opposite to the first insulation substrate, and a touch sensing unit formed on a surface of the second insulation substrate not facing the first insulation substrate. The touch sensing unit includes an electrostatic induction insulating layer formed on the second insulation substrate, an electrostatic induction pattern layer formed on the electrostatic induction insulating layer along edges of the electrostatic induction insulating layer, and a dielectric layer that covers the electrostatic induction insulating layer and the electrostatic induction pattern layer.

The electrostatic induction pattern layer may be made of at least one of silver (Ag), chromium (Cr), aluminum (Al), and indium tin oxide (ITO). Further, the electrostatic induction pattern layer may include an electrostatic induction portion in which a plurality of conductive patterns electrically separated from one another are formed along the edges of the electrostatic induction insulating layer, and a power connection portion connected to an edge of the electrostatic induction portion so as to supply power. Each of the electrostatic induction insulating layer and the dielectric layer may be made of at least one of silicon dioxide ($SiO_2$), silicon nitride ($Si_3N_4$), alumina ($Al_2O_3$), and antimony tin oxide (ATO).

The first display panel may include a plurality of thin film transistors, a plurality of pixel electrodes, and a color filter that are formed on a surface of the first insulation substrate facing the second insulation substrate. The second display panel may include a common electrode formed on a surface of the second insulation substrate facing the first insulation substrate. An electromagnetic wave shield layer may be disposed between the electrostatic induction insulating layer and the second insulation substrate. The electromagnetic wave shield layer may include a transparent conductive material. A polarization layer may be disposed on the common electrode, may be disposed between the common electrode and the second insulation substrate, and may be disposed between the electrostatic induction insulating layer and the second insulation substrate.

The first display panel may include a plurality of thin film transistors and pixel electrodes that are formed on a surface of the first insulation substrate facing the second insulation substrate, and the second display panel may include a color filter and a common electrode formed on a surface of the second insulation substrate facing the first insulation substrate. The color filter may be disposed between the second insulation substrate and the common electrode. An electromagnetic wave shield layer may be disposed between the electrostatic induction insulating layer and the second insulation substrate. The electromagnetic wave shield layer may include a transparent conductive material. A polarization layer may be disposed between the color filter and the second insulation substrate, and may be disposed between the electrostatic induction insulating layer and the second insulation substrate.

The common electrode may be disposed between the second insulation substrate and the color filter. A polarization layer may be disposed between the common electrode and the second insulation substrate, may be disposed between the color filter and the common electrode, and may be disposed between the electrostatic induction insulating layer and the second insulation substrate. The panel assembly may further include a liquid crystal layer interposed between the first display panel and the second display panel.

In view of these and other embodiments, a panel assembly may perform an input function by which external signals are input as well as a display function by which images are displayed.

DETAILED DESCRIPTION OF THE EMBODIMENTS

Figure 1:
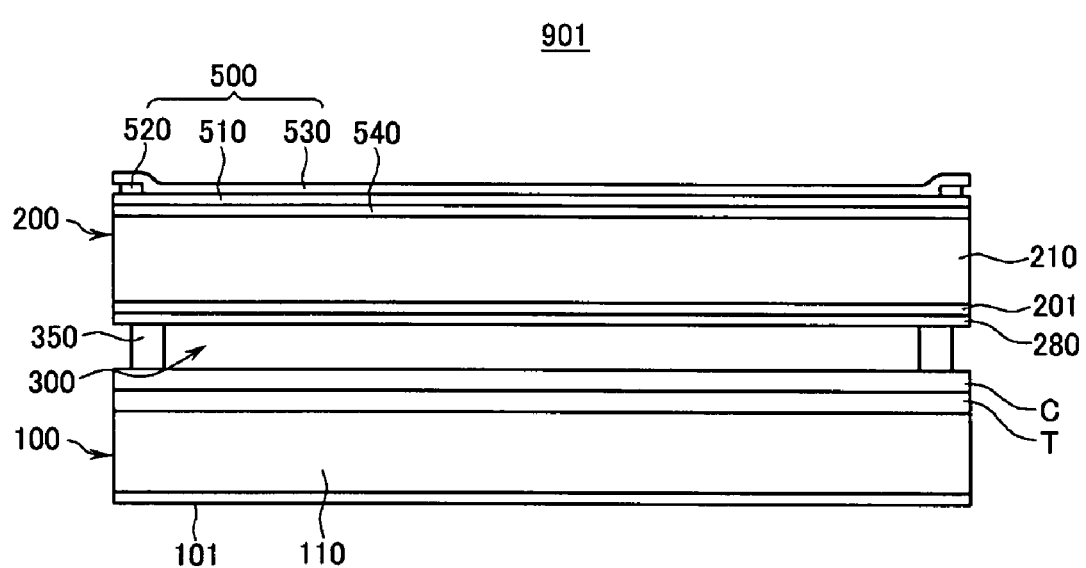
FIG. 1 is a cross-sectional view illustrating a panel assembly according to a first exemplary embodiment of the present invention.

Hereinafter, a panel assembly according to the exemplary embodiments of the present invention will be described with reference to accompanying drawings. The exemplary embodiments of the present invention are for illustrative purposes and are not intended to limit the present invention. In the exemplary embodiments of the present invention, an LCD panel is used as a panel assembly, but the present invention is not limited thereto. That is, the present invention can be applied to flat display panels, such as a plasma display panel (PDP) and an organic light emitting display (OLED) panel. In addition, parts not related to the description may be omitted for clarity, and like reference numerals designate like elements and similar constituent elements throughout the specification. Constituent elements having the same configurations in the exemplary embodiments are exemplarily described in a first exemplary embodiment using like reference numerals, and configurations different from those in the first exemplary embodiment may be described in detail in the other exemplary embodiments. In the drawings, the thickness and size of some parts may be exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, it is to be noted that when an element is referred to as being "on" another element, it does not necessarily mean that the element is formed "on" another element with the drawing as a reference.

Figure 2:
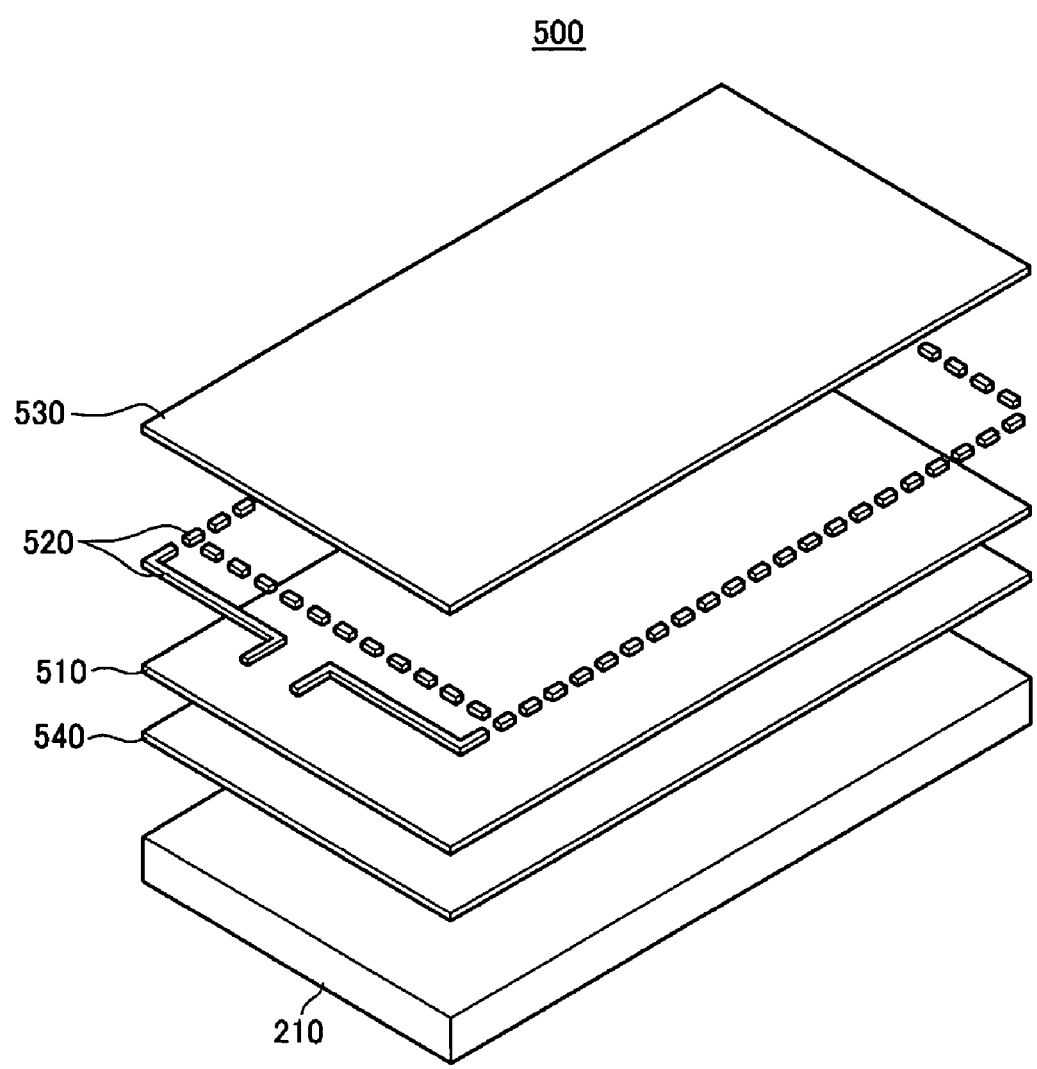
FIG. 2 is an exploded perspective view illustrating a touch sensing unit shown in FIG. 1.
Figure 3:
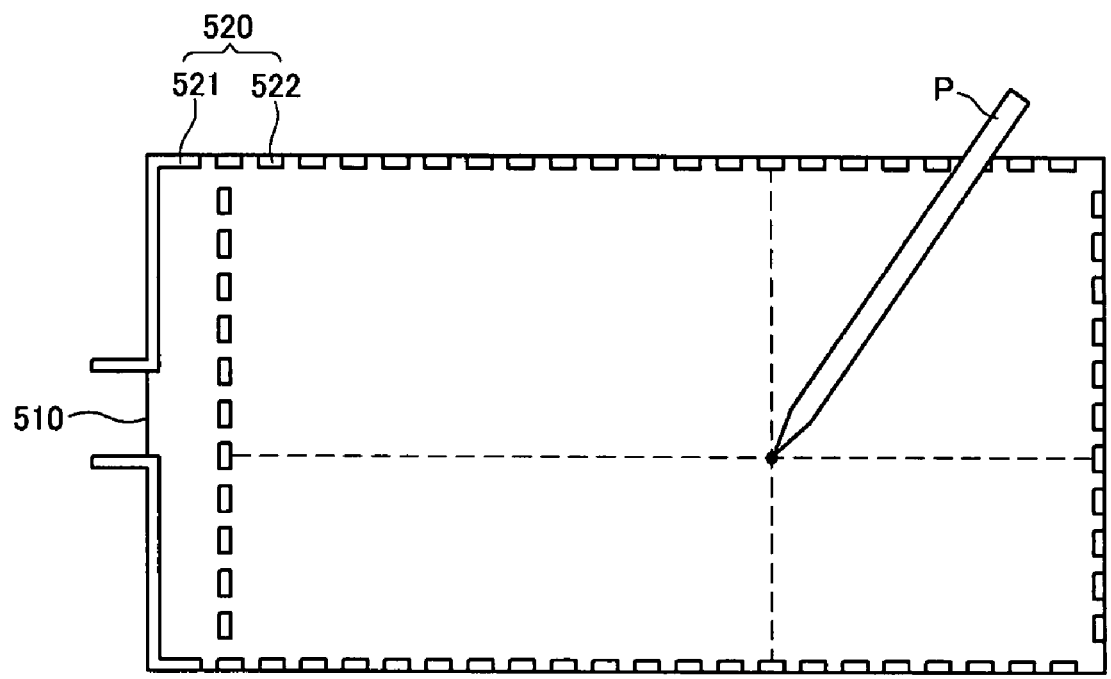
FIG. 3 is a layout view illustrating the touch sensing unit shown in FIG. 1.
Figure 4:
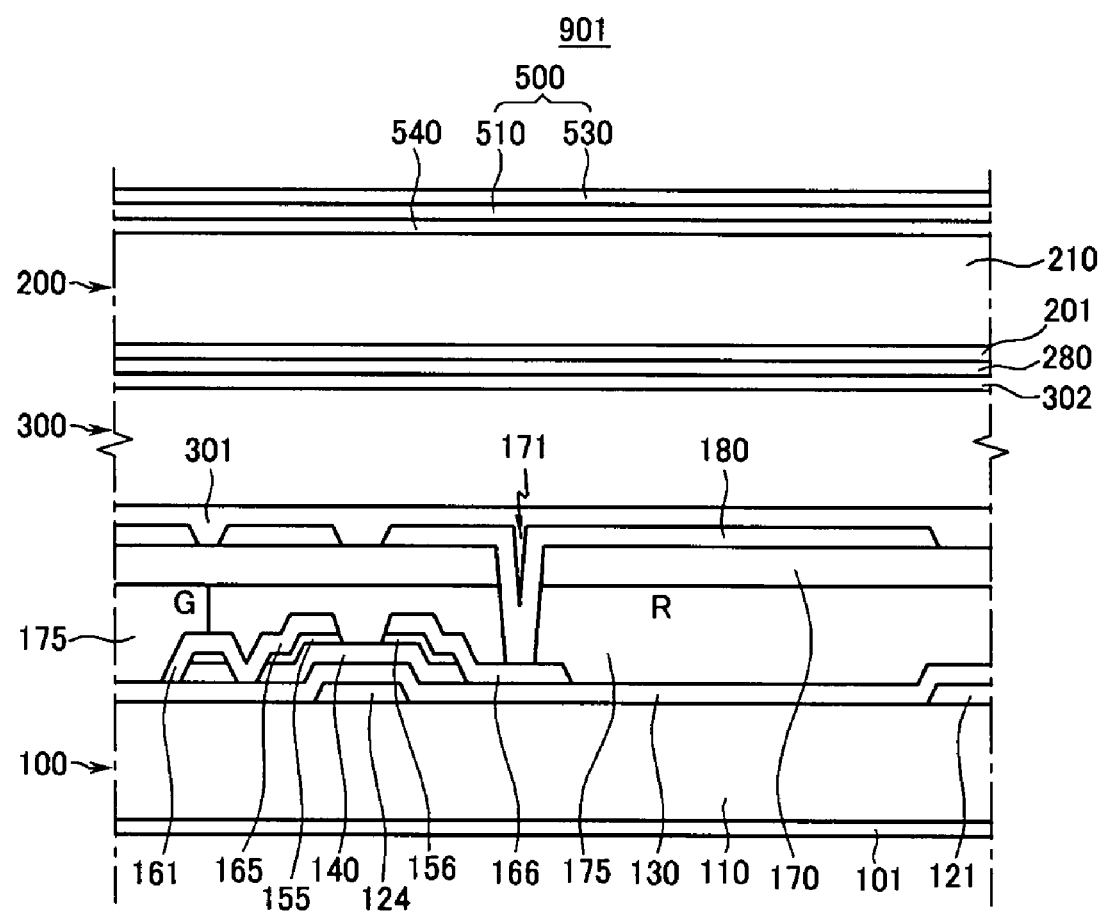
FIG. 4 is a partially enlarged sectional view illustrating the panel assembly shown in FIG. 1.

A first exemplary embodiment of the present invention will now be described with reference to FIGS. 1 to 4. FIG. 1 is a cross-sectional view illustrating a panel assembly 901. FIG. 2 is an exploded perspective view illustrating a touch sensing unit 500 shown in FIG. 1, and FIG. 3 is a layout view illustrating the touch sensing unit 500. FIG. 4 is an enlarged sectional view illustrating main parts of the panel assembly 901 for detailed description thereof. As shown in FIG. 1, the panel assembly 901 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. Here, the first display panel 100 serves as a rear substrate, the second display panel 200 serves as a front substrate. The first display panel 100 includes a first insulation substrate 110, a thin film transistor forming layer T, and a color filter forming layer C that are formed on the first insulation substrate 110. Here, the thin film transistor (TFT) forming layer T and the color filter forming layer C are formed on a surface of the first insulation substrate 110 facing a second insulation substrate 210.

The second display panel 200 includes the second insulation substrate 210, and the touch sensing unit 500 and a common electrode 280 that are formed on the second insulation substrate 210. Here, the common electrode 280 is formed on a surface of the second insulation substrate 210 facing the first insulation substrate 110, and the touch sensing unit 500 is formed on the other surface of the second insulation substrate 210 on which the common electrode 280 is not formed. The thin film transistor forming layer T includes various wiring layers, an insulating layer, and a semiconductor layer that may form a plurality of thin film transistors. In addition, the first display panel 100 further includes a plurality of pixel electrodes 180 (refer to FIG. 4) connected to the thin film transistors.

The panel assembly 901 further includes an electromagnetic wave shield layer 540 interposed between the second insulation substrate 210 and the touch sensing unit 500. The electromagnetic wave shield layer 540 is formed of a transparent conductive material, such as ITO (indium tin oxide) or IZO (indium zinc oxide). The electromagnetic wave shield layer 540 serves to prevent noise from being generated in the touch sensing unit 500 due to electromagnetic waves that are generated in circuit wiring, such as in thin film transistors, formed between the first insulation substrate 110 and the second insulation substrate 210. The noise generated due to the electromagnetic waves lowers the accuracy and reliability of the touch sensing unit 500. However, the present invention is not limited to the above structure. For example, the electromagnetic wave shield layer 540 may be omitted. In this case, the common electrode 280 formed on the second insulation substrate 210 may be configured to serve as the electromagnetic wave shield layer 540.

The panel assembly 901 further includes a first polarization layer 101 disposed on a rear surface of the first insulation substrate 110, that is, a surface of the first insulation substrate 110 not facing the second insulation substrate 210, and a second polarization layer 201 disposed between the second insulation substrate 210 and the common electrode 280. The first polarization layer 101 and the second polarization layer 201 are disposed such that light is cross-polarized. The first polarization layer 101 serves to polarize light incident on the panel assembly 901, and the second polarization layer 201 serves as an analyzer. As described above, since the second display panel 200 includes the touch sensing unit 500, the second display panel 200 has a function of a touch panel in addition to a function of a display panel. In other words, a user can input signal information by touching the panel assembly 901 with their finger or a pen, for example.

Next, the structure of the touch sensing unit 500 will be described in detail with reference to FIGS. 2 and 3. As shown in FIG. 2, the touch sensing unit 500 includes an electrostatic induction insulating layer 510 formed on the second insulation substrate 210, an electrostatic induction pattern layer 520 that is formed on the electrostatic induction insulating layer 510 along edges of the electrostatic induction insulating layer 510, and a dielectric layer 530 that covers the electrostatic induction insulating layer 510 and the electrostatic induction pattern layer 520. The electrostatic induction pattern layer 520 includes an electrostatic induction portion 522, in which a plurality of conductive patterns electrically separated from one another are formed along the edges of the electrostatic induction insulating layer 510 at regular intervals, and a power connection portion 521 formed in an edge portion of the electrostatic induction portion 522 to be disposed adjacent to the conductive patterns and supply a driving voltage to the conductive patterns. The electrostatic induction pattern layer 520 is made of at least one of silver (Ag), chromium (Cr), aluminum (Al), and indium tin oxide (ITO) so as to have conductivity. Each of the electrostatic induction insulating layer 510 and the dielectric layer 530 is made of at least one of silicon dioxide ($SiO_2$), silicon nitride ($Si_3N_4$), alumina ($Al_2O_3$), and antimony tin oxide (ATO). The electrostatic induction insulating layer 510 contributes to substantial electrostatic induction, and the dielectric layer 530 serves to protect the electrostatic induction insulating layer 510 and the electrostatic induction pattern layer 520 in addition to having an electrostatic induction function.

As shown in FIG. 3, the electrostatic induction portion 522 is patterned such that static charges are uniformly distributed over the electrostatic induction insulating layer 510 and the dielectric layer 530. That is, when the driving voltage is applied through the power connection portion 521, even though the conductive patterns are not physically connected to the power connection portion 521, the conductive patterns of the electrostatic induction portion 522 adjacent to the power connection portion 521 are under the influence of the driving voltage by electrostatic induction. Thus, all the conductive patterns of the electrostatic induction portions 522 are supplied with the driving voltage, which is applied from the power connection portion 521, by electrostatic induction that occurs between two adjacent conductive patterns. At this time, the electrostatic induction influences the conductive patterns opposite to each other in upper and lower positions and the conductive patterns opposite to each other in left and right positions as well as two adjacent conductive patterns. Thereby, the adjacent conductive patterns and the opposite conductive patterns function as capacitors such that charges are charged therein, based on the driving voltage applied to the conductive patterns. Capacitors formed between the conductive patterns opposite in the upper and lower positions are referred to as "a plurality of X-axis capacitors", while capacitors formed between the conductive patterns opposite in the left and right positions are referred to as "a plurality of Y-axis capacitors".

At this time, a magnitude of the driving voltage applied to each conductive pattern is as uniform as possible, and may be adjusted by controlling distances between the plurality of conductive patterns of the electrostatic induction portion 522 or the shape of the conductive patterns.

In this state, if a user touches a surface of the dielectric layer 530 with an external object such as a finger, a pen P, or the like, charges in the capacitors formed at the touched position are discharged to the outside through the user's finger or the pen P such that capacitances at the touched position are varied.

In an initial state in which the driving voltage having a predetermined magnitude is applied to the power connection portion 21, but the touch does not occur, after determining capacitances charged in the X-axis capacitors and Y-axis capacitors every predetermined distance unit, the determined capacitances are stored in a storing unit such as a memory (not shown) as initial capacitances.

Thus, a signal processor (not shown) determines capacitances of the X-axis capacitors and Y-axis capacitors every predetermined distance and compares the determined capacitances to the initial capacitances, respectively, to determine whether the touch occurs and a touch position. That is, the signal processor may determine whether the touch occurs, based on capacitance variations at each corresponding position, and may determine the touch position based on positions of the X-axis and Y-axis capacitors, in which the amount of the capacitance variation is larger than a predetermined amount.

Alternatively, the signal processor may determine whether a touch occurs and a touch position, based on current variations or voltage variations in accordance with the capacitance variations using a separate signal processing unit.

Accordingly, the touched position can be detected by sensing the variation of the electrostatic voltage that is induced at the touched position by the electrostatic induction effect.

Next, the inner structure of the panel assembly 901 will be described in detail with reference to FIG. 4. FIG. 4 shows the panel assembly 901 in which a color filter 175 is formed on the first display panel 100, that is, the first insulation substrate 110, using a COA (color filter on array) method. The panel assembly 901 includes the first display panel 100, the second display panel 200 opposite to the first display panel 100, and the liquid crystal layer 300 having liquid crystal molecules interposed between the first display panel 100 and the second display panel 200. The display panels 100 and 200 include alignment layers 301 and 302, respectively. The alignment layers 301 and 302 may allow liquid crystal molecules of the liquid crystal layer 300 to be aligned in a twisted nematic mode in which the liquid crystal molecules of the liquid crystal layer 300 are aligned so as to be twisted sequentially from the first display panel 100 to the second display panel 200. Alternatively, the alignment layers 301 and 302 may allow the liquid crystal molecules of the liquid crystal layer 300 to be aligned vertically with respect to both the first and second display panels 100 and 200. In addition, although not shown, the panel assembly 901 may further include a spacer that is provided between the first and second display panels 100 and 200 so as to maintain a distance therebetween.

First, the first display panel 100 will be described in detail. A plurality of gate lines 121 that mainly extend in the horizontal direction are formed on the first insulation substrate 110 made of an insulating material such as glass, quartz, ceramic, or plastic. A plurality of portions of each of the gate lines 121 form a plurality of gate electrodes 124. Further, although not shown, storage electrode wiring may be formed on the first insulation substrate 110 by using the same layer as the gate lines 121.

The gate wires including the gate line 121 and the gate electrode 124 are made of a metal such as Al, Ag, Cr, Ti, Ta, and Mo, or an alloy thereof. The gate wires 121 and 124, which are shown in FIG. 2, according to the exemplary embodiment of the present invention are formed of a single layer; however, the gate wires 121 and 124 may be formed of multi-layers including a metal layer, which is made of, for example, Cr, Mo, Ti, Ta, or an alloy thereof, and an Al-based or Ag-based metal layer having low resistivity. Here, Cr, Mo, Ti, and Ta have excellent physical and chemical contact characteristics. Alternatively, the gate wires 121 and 124 may be formed by using various metals or conductors. Preferably, the gate wires 121 and 124 are formed of multi-layers that can be patterned under the same etching condition. Further, a side surface of the gate line 121 is inclined, and it is preferable that the inclination angle of the side surface of the gate line 121 with respect to a horizontal plane is in the range of 30 to 80°. A gate insulating layer 130 made of, for example, silicon nitride (SiNx) is formed on the gate wires 121 and 124.

Further, a plurality of data lines 161, and a plurality of source electrodes 165 and a plurality of drain electrodes 166 connected to the plurality of data lines 161, are formed on the gate insulating layer 130. The data lines 161 mainly extend in the vertical direction, cross the gate lines 121, and branch toward the drain electrodes 166 to form the source electrodes 165. Here, a gate electrode 124, a source electrode 165, and a drain electrode 166 form three electrodes of a thin film transistor. In the same manner as the gate wires 121 and 124, data wires including the data lines 161, the source electrodes 165, and the drain electrodes 166 may also be made of a conductive material, such as chromium, molybdenum, aluminum, or an alloy thereof, and be formed of a single layer or multi-layers.

Semiconductor stripes 140 are formed below the data wire 161, 165, and 166. The semiconductor stripes 140 made of amorphous silicon, for example, forms a channel of the thin film transistor between the gate electrode 124, the source electrode 165, and the drain electrode 166. In addition, resistive contact members (ohmic contacts) 155 and 156 are formed between the semiconductor stripes 140 and the data wires 161, 165, and 166 in order to reduce the contact resistance therebetween. The ohmic contacts 155 and 156 are either doped or made of silicide. The island ohmic contact 156 faces the other ohmic contact 155 with the gate electrode 124 as a reference.

Further, color filters 175 having three primary colors (R=Red, G=Green, B=Blue) are sequentially disposed on the data wires 161, 165, and 166. The colors of the color filters 175 are not limited to the three primary colors, but they may be variously configured to have at least one color. Alternatively, unlike FIG. 3, the color filters 175 may be formed on the thin film transistors, the data lines 161, and the gate lines 121 such that different colors overlap each other. In this case, overlapping portions of the color filters 175 serve to shield light.

On the color filters 175, a passivation layer 170 made of an organic material that has photosensitivity and an excellent planarization characteristic, an inorganic insulating material such as silicon nitride, or an insulating material such as a-Si:C:O or a-Si:O:F that has low a dielectric constant and is formed by a PECVD (plasma enhanced chemical vapor deposition) method, is formed. The passivation layer 170 and the color filters 175 are formed with a plurality of contact holes 171 through which at least parts of the drain electrodes 166 are exposed. Further, a plurality of pixel electrodes 180 are formed on the passivation layer 170. The pixel electrodes 180 are formed of transparent conductors, such as ITO or IZO. In addition, the first polarization layer 101 is formed on the other surface of the first insulation substrate 110 not facing the second insulation substrate 210.

Next, the second display panel 200 will be described in detail. In the same manner as the first insulation substrate 110, the second polarization layer 201 is formed on a surface of the second insulation substrate 210, facing the first insulation substrate 110. The second insulation substrate 210 is made of an insulating material, such as glass, quartz, ceramic, or plastic. Here, the second polarization layer 201 may be formed using a wire grid polarizer. Then, the common electrode 280 is formed on the second polarization layer 201. The common electrode 280 and a pixel electrode 180 form an electric field by which liquid crystal molecules are driven, and the common electrode 280 is made of a transparent conductive material such as ITO or IZO.

Although not shown in FIG. 3, a light blocking member may be further formed on the first insulation substrate 110. The light blocking member has an opening opposite to the pixel electrode 180 of the first display panel 100 and serves to block light from leaking between adjacent pixels. Further, the light blocking member is also formed at a position corresponding to the thin film transistor so as to block external light that is incident on the channel of the thin film transistor. The light blocking member is formed of a metal layer, which is made of chromium, chromium oxide, chromium nitride, or a combination thereof, or a photosensitive organic material in which a black pigment is added to block light. Here, the black pigment includes carbon black, titanium oxide, or the like.

The electromagnetic wave shield layer 540 is formed on the other surface of the second insulation substrate 210 not facing the first insulation substrate 110. Then, the electrostatic induction insulating layer 510 is formed on the electromagnetic wave shield layer 540, and the electrostatic induction pattern layer 520 is formed along the edges of the electrostatic induction insulating layer 510. Finally, the dielectric layer 530 that covers the electrostatic induction insulating layer 510 and the electrostatic induction pattern layer 520 is formed.

With this configuration described above, the panel assembly 901 can perform an input function by which external signals are input as well as a display function by which images are displayed.

Furthermore, a separate process of forming the touch sensing unit 500 is not performed, but the touch sensing unit 500 is simultaneously formed in a process of manufacturing the panel assembly 901. Thus, it is possible to improve productivity in manufacturing the panel assembly 901 having the input function. In this way it is possible to maximize the effective display area of the panel assembly 901 having an input function. It is also possible to minimize deterioration of quality of images displayed by the panel assembly 901 having the input function. It is further possible to prevent defects due to degradation of light characteristics of the touch sensing unit 500, for example.

Figure 5:
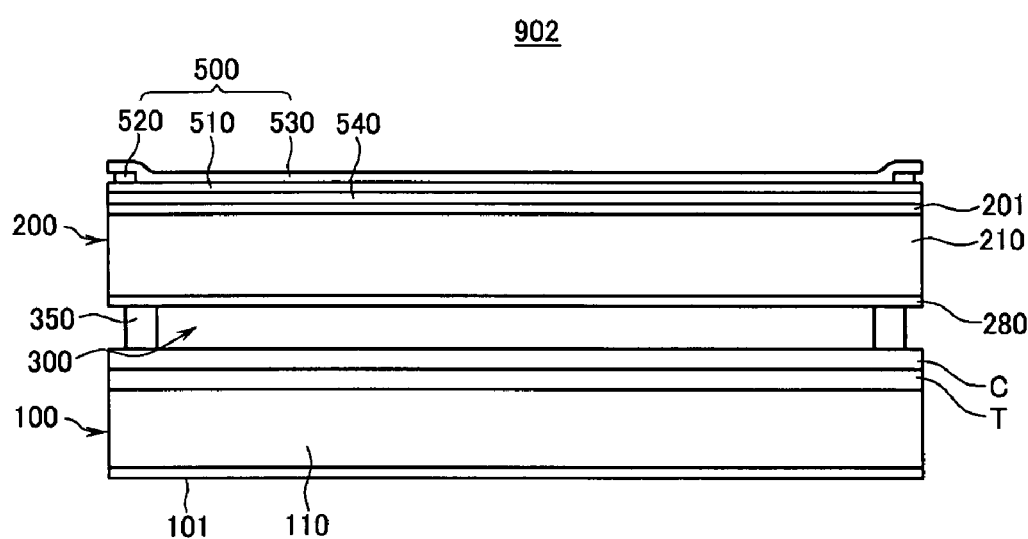
FIG. 5 is a cross-sectional view illustrating a panel assembly according to a second exemplary embodiment of the present invention.
Figure 6:
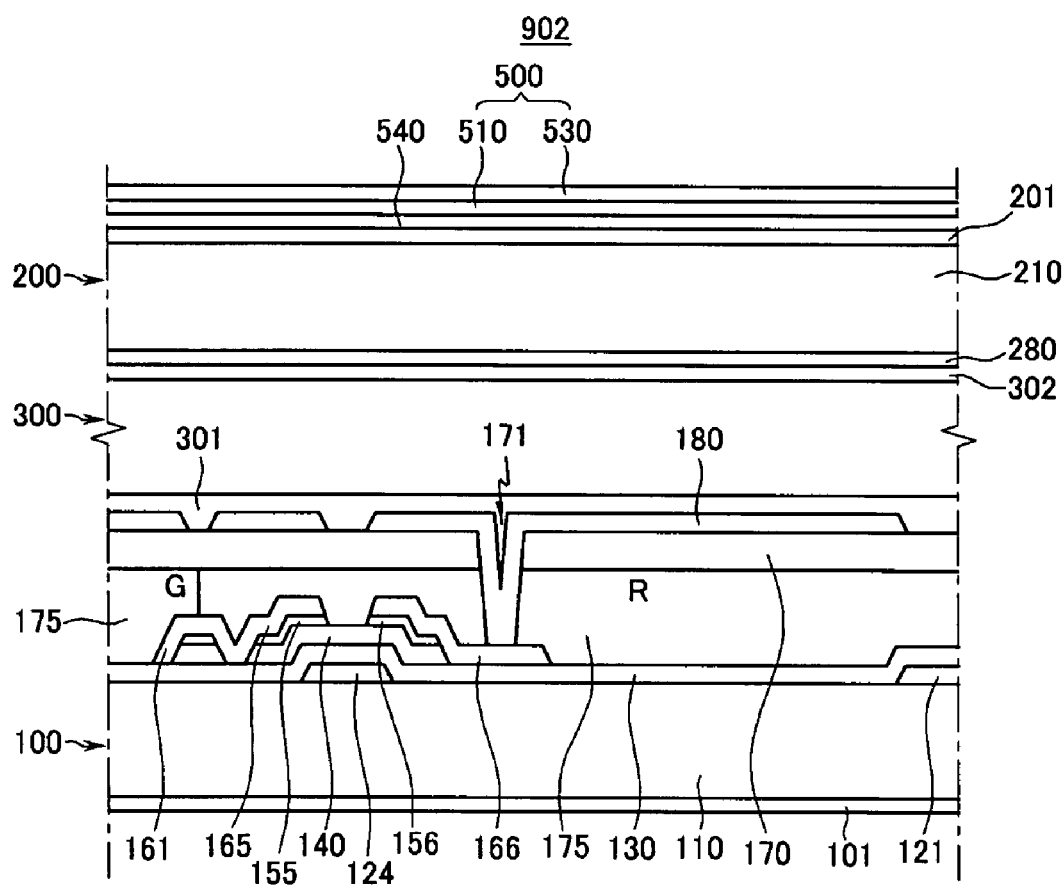
FIG. 6 is a partially enlarged sectional view illustrating the panel assembly shown in FIG. 5.

Hereinafter, a second exemplary embodiment of the present invention will be described with reference to FIGS. 5 and 6. FIG. 5 is a cross-sectional view illustrating a panel assembly 902, and FIG. 6 is an enlarged sectional view illustrating main parts of the panel assembly 902 for detailed description thereof. The panel assembly 902 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. The first display panel 100 serves as a rear substrate, and the second display panel 200 serves as a front substrate. The first display panel 100 includes a first insulation substrate 110, a thin film transistor forming layer T, and a color filter forming layer C that are formed on the first insulation substrate 110. The thin film transistor forming layer T and the color filter forming layer C are formed on a surface of the first insulation substrate 110 facing a second insulation substrate 210. The second display panel 200 includes the second insulation substrate 210, a touch sensing unit 500, and a common electrode 280 that are formed on the second insulation substrate 210. The common electrode 280 is formed on a surface of the second insulation substrate 210 facing the first insulation substrate 110, and the touch sensing unit 500 is formed on the other surface of the second insulation substrate 210 on which the common electrode 280 is not formed.

The panel assembly 902 further includes an electromagnetic wave shield layer 540 interposed between the second insulation substrate 210 and the touch sensing unit 500. The electromagnetic wave shield layer 540 is formed of a transparent conductive material, such as ITO or IZO. The electromagnetic wave shield layer 540 serves to prevent noise from being generated in the touch sensing unit 500 due to electromagnetic waves that are generated in circuit wiring, such as thin film transistors, formed between the first insulation substrate 110 and the second insulation substrate 210. The noise that is generated due to the electromagnetic waves lower the accuracy and reliability of the touch sensing unit 500. However, the present invention is not limited to the above structure. For example, the electromagnetic wave shield layer 540 may be omitted. In this case, the common electrode 280 formed on the second insulation substrate 210 may be configured to serve as the electromagnetic wave shield layer 540.

The panel assembly 902 further includes a first polarization layer 101 disposed on a rear surface of the first insulation substrate 110, that is, a surface of the first insulation substrate 110 not facing the second insulation substrate 210, and a second polarization layer 201 disposed on a front surface of the second insulation substrate 210, that is, a surface of the second insulation substrate 210 not facing the first insulation substrate 110. The second polarization layer 201 is disposed between the second insulation substrate 210 and the touch sensing unit 500. Even though the second polarization layer 201 is disposed between the second insulation substrate 210 and the electromagnetic wave shield layer 540 in FIGS. 5 and 6, the present invention is not limited thereto. For example, the second polarization layer 201 may be disposed between the electromagnetic wave shield layer 540 and the electrostatic induction insulating layer 510 of the touch sensing unit 500. The first polarization layer 101 and the second polarization layer 201 are disposed such that light is cross-polarized. The first polarization layer 101 serves to polarize light incident on the panel assembly 902, and the second polarization layer 201 serves as an analyzer.

With this configuration described above, the panel assembly 902 can perform an input function by which external signals are input as well as a display function by which images are displayed. Further, since the second polarization layer 201 is disposed at a location other than a portion between the second insulation substrate 210 and the first insulation substrate 110, the second polarization layer 201 can be made of various materials. As a result, the second polarization layer 201 can be more economically manufactured.

Figure 7:
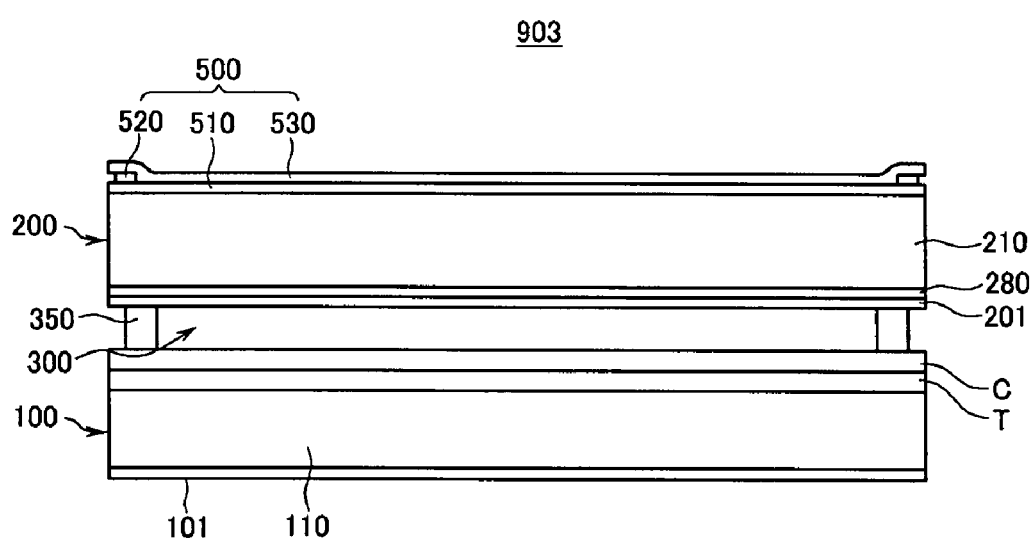
FIG. 7 is a cross-sectional view illustrating a panel assembly according to a third exemplary embodiment of the present invention.
Figure 8:
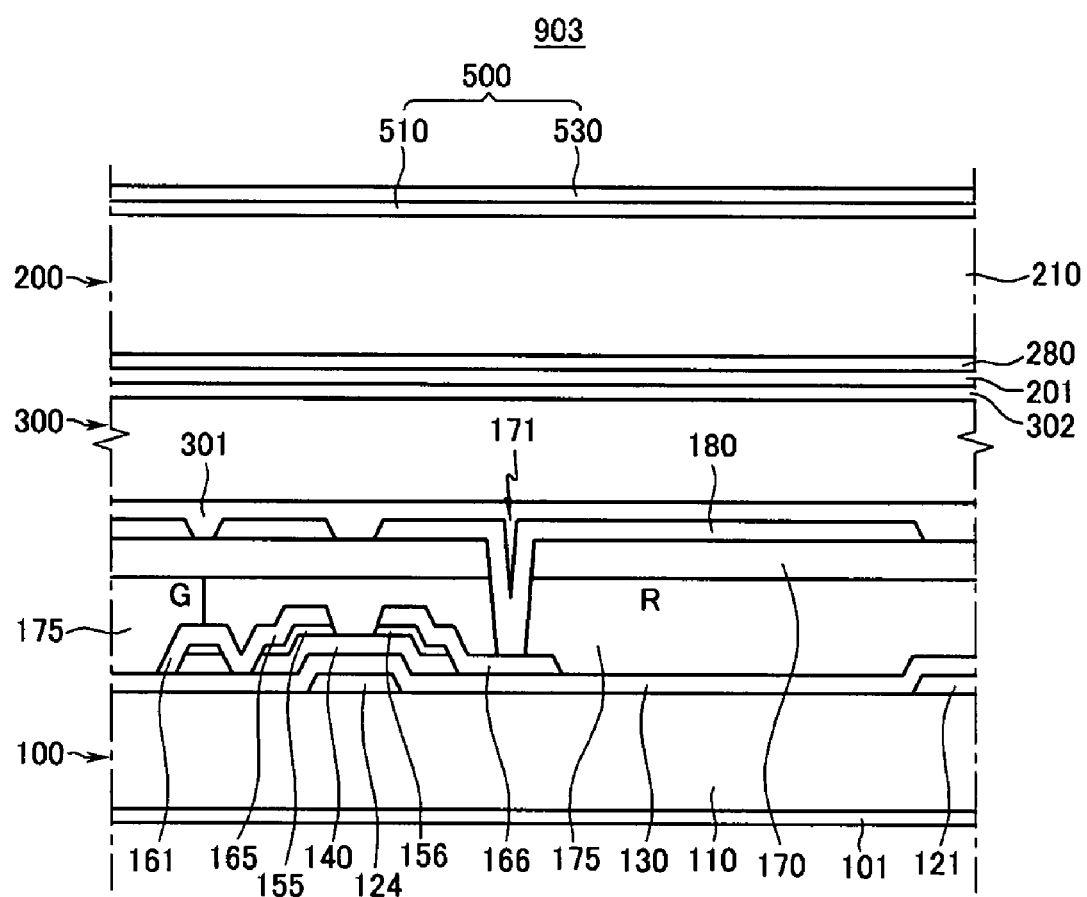
FIG. 8 is a partially enlarged sectional view illustrating the panel assembly shown in FIG. 7.

Hereinafter, a third exemplary embodiment of the present invention will be described with reference to FIGS. 7 and 8. FIG. 7 is a cross-sectional view illustrating a panel assembly 903, and FIG. 8 is an enlarged sectional view illustrating main parts of the panel assembly 903 for detailed description thereof. The panel assembly 903 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. Here, the first display panel 100 serves as a rear substrate, and the second display panel 200 serves as a front substrate. The first display panel 100 includes a first insulation substrate 110, a thin film transistor forming layer T, and a color filter forming layer C that are formed on the first insulation substrate 110. The thin film transistor forming layer T and the color filter forming layer C are formed on a surface of the first insulation substrate 110 facing a second insulation substrate 210. The second display panel 200 includes the second insulation substrate 210, a touch sensing unit 500, and a common electrode 280 that are formed on the second insulation substrate 210. The common electrode 280 is formed on a surface of the second insulation substrate 210 facing the first insulation substrate 110, and the touch sensing unit 500 is formed on the other surface of the second insulation substrate 210 on which the common electrode 280 is not formed.

The panel assembly 903 further includes a first polarization layer 101 disposed on a rear surface of the first insulation substrate 110, that is, a surface of the first insulation substrate 110 not facing the second insulation substrate 210, and a second polarization layer 201 disposed on the common electrode 280. Furthermore, the second polarization layer 201 is formed on a surface of the common electrode 280 facing the first insulation substrate 110. The second polarization layer 201 may be formed using a wire grid polarizer. The first polarization layer 101 and the second polarization layer 201 are disposed such that light is cross-polarized. At this time, the first polarization layer 101 serves to polarize light incident on the panel assembly 903, and the second polarization layer 201 serves as an analyzer. Furthermore, the common electrode 280 according to the third exemplary embodiment of the present invention and a pixel electrode 180 of the first display panel 100 form an electric field by which liquid crystal molecules are driven, and the common electrode 280 also serves to prevent noise from being generated in the touch sensing unit 500 due to electromagnetic waves that are generated in circuit wiring, such as thin film transistors, formed between the first insulation substrate 110 and the second insulation substrate 210. That is, an additional configuration that is only for blocking electromagnetic waves is omitted. Even with this configuration described above, the panel assembly 903 can perform an input function by which external signals are input as well as a display function by which images are displayed. In addition, since the additional configuration for blocking electromagnetic waves is omitted, it is possible to simplify the entire configuration and manufacturing process.

Figure 9:
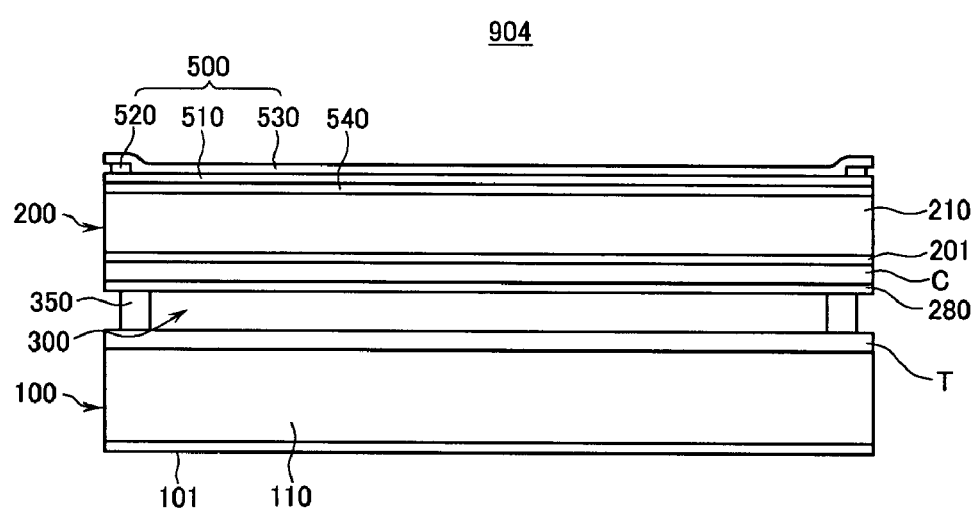
FIG. 9 is a cross-sectional view illustrating a panel assembly according to a fourth exemplary embodiment of the present invention.
Figure 10:
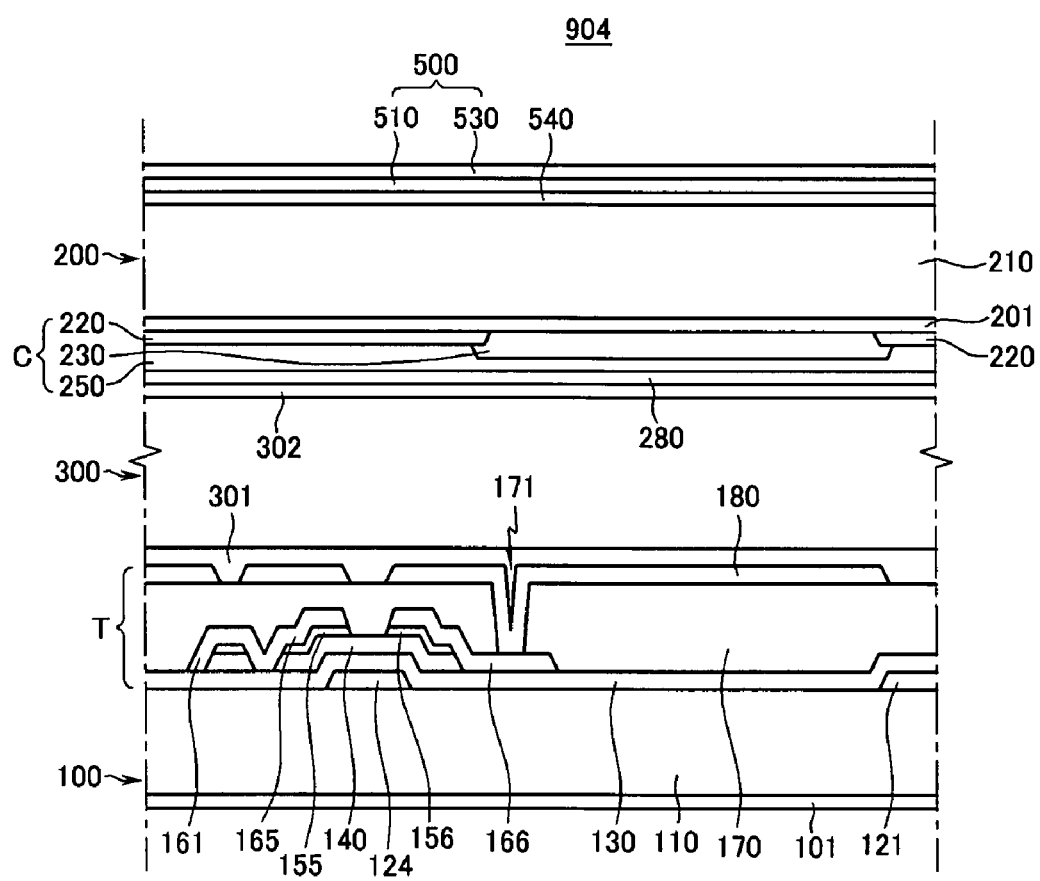
FIG. 10 is a partially enlarged sectional view illustrating the panel assembly shown in FIG. 9.

Hereinafter, a fourth exemplary embodiment of the present invention will be described with reference to FIGS. 9 and 10. FIG. 9 is a cross-sectional view illustrating a panel assembly 904, and FIG. 10 is an enlarged sectional view illustrating main parts of the panel assembly 904 for detailed description. The panel assembly 904 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. Here, the first display panel 100 serves as a rear substrate, and the second display panel 200 serves as a front substrate.

The first display panel 100 includes a first insulation substrate 110 and a thin film transistor forming layer T that is formed on the first insulation substrate 110. The thin film transistor forming layer T is formed on a surface of the first insulation substrate 110 facing a second insulation substrate 210. The thin film transistor forming layer T includes various layers, such as a wiring layer, an insulating layer, and a semiconductor layer configured to form a plurality of thin film transistors. The first display panel 100 further includes pixel electrodes 180 connected to thin film transistors.

The second display panel 200 includes the second insulation substrate 210, and a touch sensing unit 500, a common electrode 280, and a color filter forming layer C that are formed on the second insulation substrate 210. The common electrode 280 and the color filter forming layer C are formed on a surface of the second insulation substrate 210 facing the first insulation substrate 110, and the touch sensing unit 500 is formed on the other surface of the second insulation substrate 210 on which the common electrode 280 is not formed. Furthermore, the color filter forming layer C is disposed between the second insulation substrate 210 and the common electrode 280. The color filter forming layer C further includes a color filter 230, a light blocking member 220, and a planarizing layer 250.

In addition, the panel assembly 904 includes an electromagnetic wave shield layer 540 interposed between the second insulation substrate 210 and the touch sensing unit 500. However, the present invention is not limited to the above structure. For example, the electromagnetic wave shield layer 540 may be omitted. In this case, the common electrode 280 formed on the second insulation substrate 210 may be configured to serve as the electromagnetic wave shield layer 540. The panel assembly 904 further includes a first polarization layer 101 disposed on a rear surface of the first insulation substrate 110, that is, a surface of the first insulation substrate 110 not facing the second insulation substrate 210, and a second polarization layer 201 disposed between the second insulation substrate 210 and the color filter forming layer C.

Next, the inner structure of the panel assembly 904 will be described in detail with reference to FIG. 10. The first display panel 100 includes the first insulation substrate 110, gate wires 121 and 124, a gate insulating layer 130, semiconductor stripes 140, ohmic contacts 155 and 156, data wires 161, 165, and 166, a passivation layer 170, and pixel electrodes 180, which are sequentially formed on the first insulation substrate 110. Here, unlike in the first exemplary embodiment, the first display panel 100 does not include a color filter. The second display panel 200 includes: the second insulation substrate 210; the second polarization layer 201 formed on a surface of the second insulation substrate 210 facing the first insulation substrate 110; the light blocking member 220, the color filter member 230, and the planarizing layer 250 sequentially formed on the second polarization layer 201; and the common electrode 280 formed on the planarizing layer 250. Here, the second polarization layer 201 may be formed using a wire grid polarizer.

The light blocking member 220 has an opening opposite to the pixel electrode 180 of the first display panel 100 and serves to block light from leaking between adjacent pixels. The light blocking member 220 is also formed at the position corresponding to the thin film transistor so as to block external light that is incident on the channel of the thin film transistor. The electromagnetic wave shield layer 540 is formed on the other surface of the second insulation substrate 210 not facing the first insulation substrate 110. Then, the electrostatic induction insulating layer 510 is formed on the electromagnetic wave shield layer 540, and the electrostatic induction pattern layer 520 is formed along the edges of the electrostatic induction insulating layer 510. Finally, the dielectric layer 530 that covers the electrostatic induction insulating layer 510 and the electrostatic induction pattern layer 520 is formed. Even with this configuration described above, the panel assembly 904 can perform an input function by which external signals are input as well as a display function by which images are displayed. That is, even with a structure in which the color filter 230 is formed in the second display panel 200, it is possible to provide the panel assembly 904 having an input function.

Figure 11:
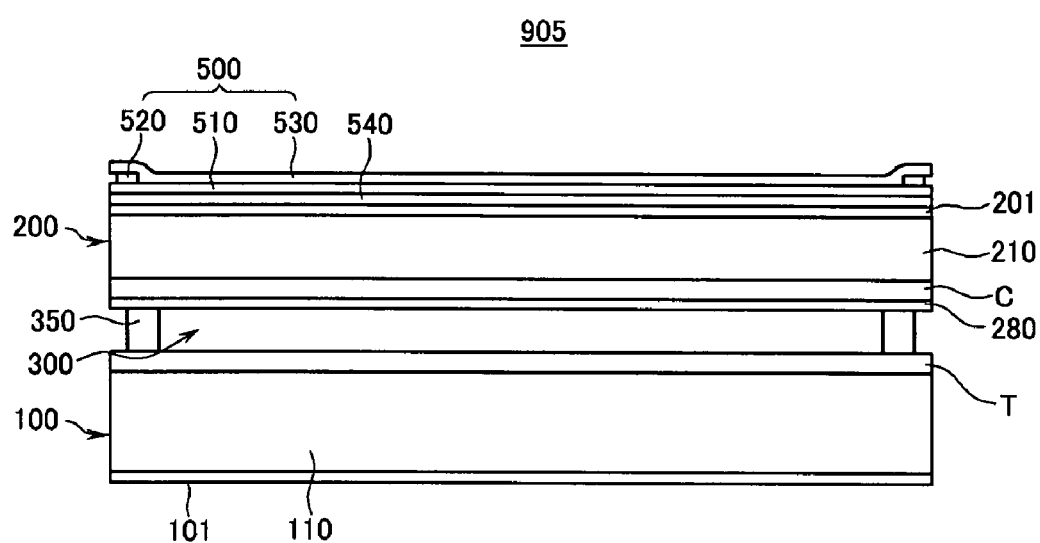
FIG. 11 is a cross-sectional view illustrating a panel assembly according to a fifth exemplary embodiment of the present invention.
Figure 12:
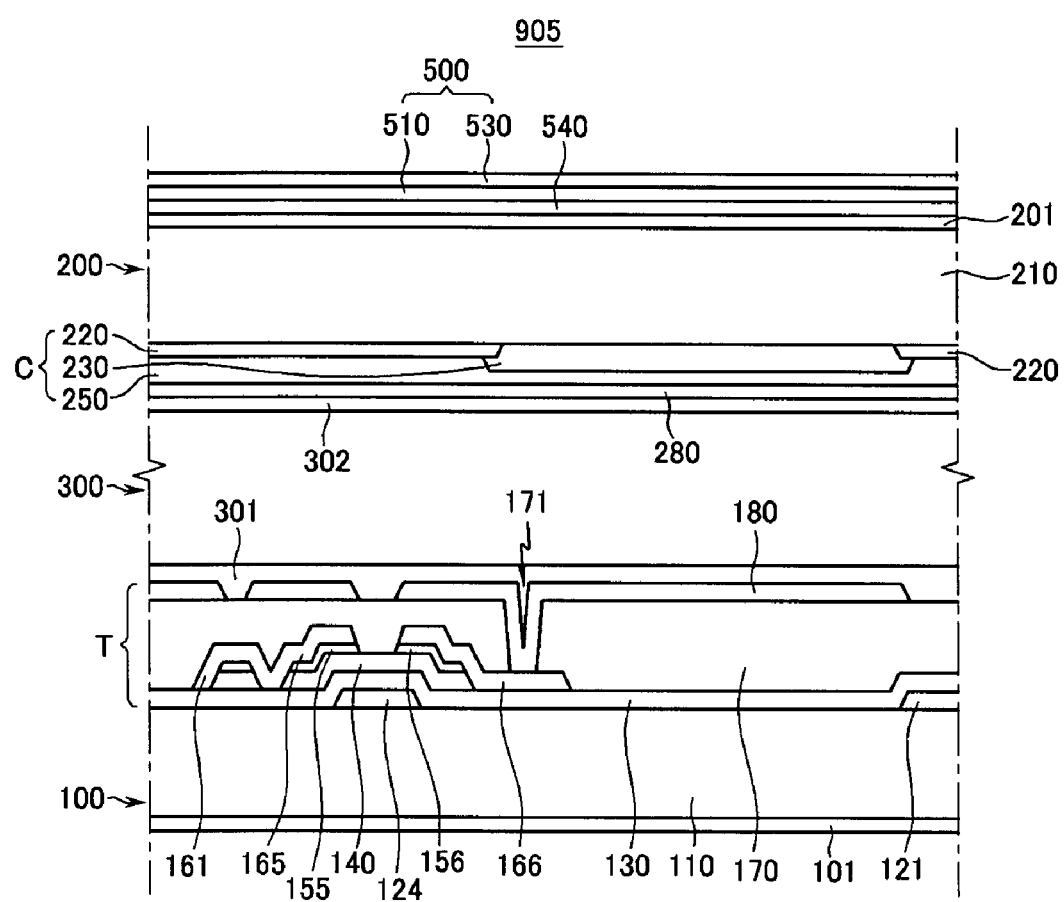
FIG. 12 is a partially enlarged sectional view illustrating the panel assembly shown in FIG. 11.

Hereinafter, a fifth exemplary embodiment of the present invention will be described with reference to FIGS. 11 and 12. FIG. 11 is a cross-sectional view illustrating a panel assembly 905, and FIG. 12 is an enlarged sectional view illustrating main parts of the panel assembly 905 for detailed description thereof. The panel assembly 905 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. Here, the first display panel 100 serves as a rear substrate, and the second display panel 200 serves as a front substrate. The first display panel 100 includes a first insulation substrate 110 and a thin film transistor forming layer T that is formed on the first insulation substrate 110. Here, the thin film transistor forming layer T is formed on a surface of the first insulation substrate 110 facing a second insulation substrate 210. In addition, the first display panel 100 further includes pixel electrodes 180 connected to thin film transistors.

The second display panel 200 includes the second insulation substrate 210, and a touch sensing unit 500, a common electrode 280, and a color filter forming layer C that are formed on the second insulation substrate 210. The common electrode 280 and the color filter forming layer C are formed on a surface of the second insulation substrate 210 facing the first insulation substrate 110, and the touch sensing unit 500 is formed on the other surface of the second insulation substrate 210 on which the common electrode 280 is not formed. Furthermore, the color filter forming layer C is disposed between the second insulation substrate 210 and the common electrode 280. The color filter forming layer C includes a color filter 230, a light blocking member 220, and a planarizing layer 250.

The panel assembly 905 further includes an electromagnetic wave shield layer 540 interposed between the second insulation substrate 210 and the touch sensing unit 500. However, the present invention is not limited to the above structure. For example, the electromagnetic wave shield layer 540 may be omitted. In this case, the common electrode 280 formed on the second insulation substrate 210 may be configured to serve as the electromagnetic wave shield layer 540.

In addition, the panel assembly 905 includes a first polarization layer 101 disposed on a rear surface of the first insulation substrate 110, that is, a surface of the first insulation substrate 110 not facing the second insulation substrate 210, and a second polarization layer 201 disposed on a front surface of the second insulation substrate 210, that is, a surface of the second insulation substrate 210 not facing the first insulation substrate 110. The second polarization layer 201 is disposed between the second insulation substrate 210 and the touch sensing unit 500. Even though the second polarization layer 201 is disposed between the second insulation substrate 210 and the electromagnetic wave shield layer 540 in FIGS. 11 and 12, the present invention is not limited thereto. For example, the second polarization layer 201 may be disposed between the electromagnetic wave shield layer 540 and the electrostatic induction insulating layer 510 of the touch sensing unit 500.

The first polarization layer 101 and the second polarization layer 201 are disposed such that light is cross-polarized. At this time, the first polarization layer 101 serves to polarize light incident on the panel assembly 905, and the second polarization layer 201 serves as an analyzer. Even with this configuration described above, the panel assembly 905 can perform an input function by which external signals are input as well as a display function by which images are displayed. That is, even with a structure in which the color filter 230 is formed in the second display panel 200, it is possible to provide the panel assembly 905 having an input function. Further, since the second polarization layer 201 is disposed at the location other than a portion between the second insulation substrate 210 and the first insulation substrate 110, the second polarization layer 201 can be made of various materials. As a result, the second polarization layer 201 can be more economically manufactured.

Figure 13:
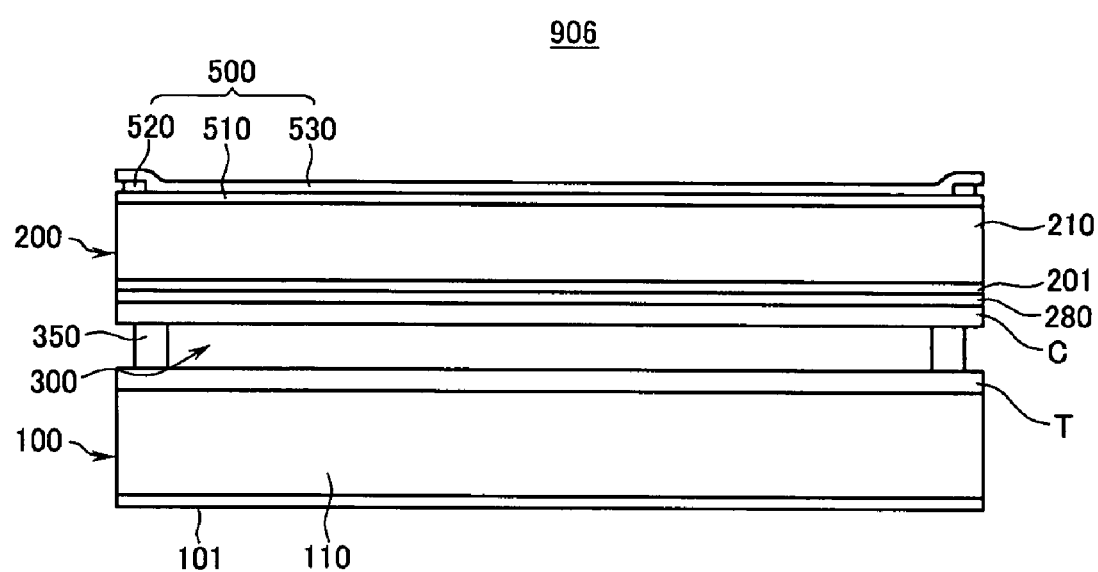
FIG. 13 is a cross-sectional view illustrating a panel assembly according to a sixth exemplary embodiment of the present invention.
Figure 14:
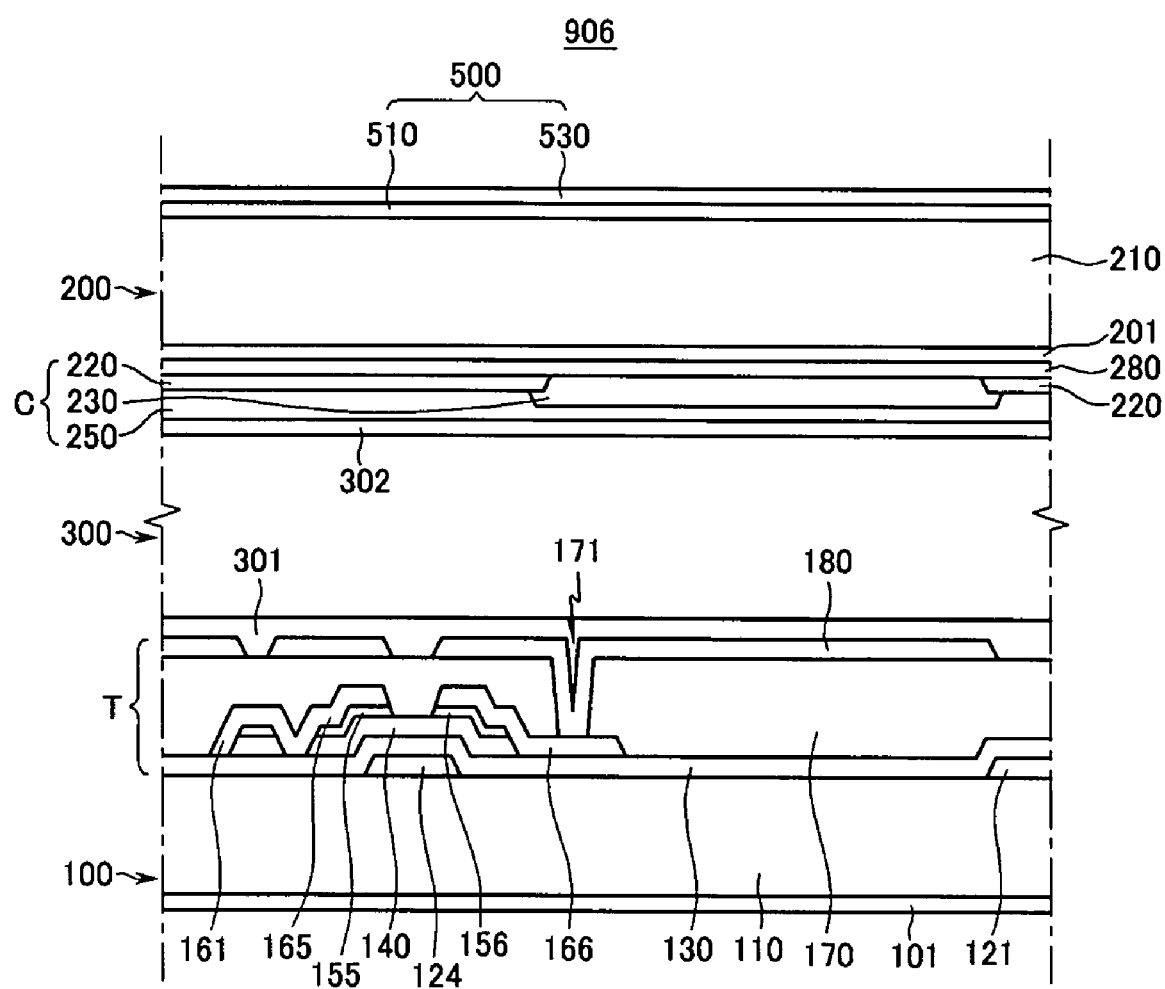
FIG. 14 is a partially enlarged sectional view illustrating the panel assembly shown in FIG. 13.

Hereinafter, a sixth exemplary embodiment of the present invention will be described with reference to FIGS. 13 and 14. FIG. 13 is a cross-sectional view illustrating a panel assembly 906, and FIG. 14 is an enlarged sectional view illustrating main parts of the panel assembly 906 for detailed description. The panel assembly 906 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. Here, the first display panel 100 serves as a rear substrate, and the second display panel 200 serves as a front substrate. The first display panel 100 includes a first insulation substrate 110 and a thin film transistor forming layer T that is formed on the first insulation substrate 110. Here, the thin film transistor forming layer T is formed on a surface of the first insulation substrate 110 facing a second insulation substrate 210. In addition, the first display panel 100 further includes pixel electrodes 180 connected to thin film transistors. The second display panel 200 includes the second insulation substrate 210, and a touch sensing unit 500, a common electrode 280, and a color filter forming layer C that are formed on the second insulation substrate 210. Here, the common electrode 280 and the color filter forming layer C are formed on a surface of the second insulation substrate 210 facing the first insulation substrate 110, and the touch sensing unit 500 is formed on the other surface of the second insulation substrate 210 on which the common electrode 280 is not formed. Furthermore, the common electrode 280 is disposed between the second insulation substrate 210 and the color filter forming layer C. The color filter forming layer C includes a color filter 230, a light blocking member 220, and a planarizing layer 250.

The panel assembly 906 further includes a first polarization layer 101 disposed on a rear surface of the first insulation substrate 110, that is, a surface of the first insulation substrate 110 not facing the second insulation substrate 210, and a second polarization layer 201 disposed between the second insulation substrate 210 and the common electrode 280. The first polarization layer 101 and the second polarization layer 201 are disposed such that light is cross-polarized. At this time, the first polarization layer 101 serves to polarize light incident on the panel assembly 906, and the second polarization layer 201 serves as an analyzer.

Furthermore, the common electrode 280 according to the sixth exemplary embodiment of the present invention and a pixel electrode 180 of the first display panel 100 form an electric field by which liquid crystal molecules are driven, and the common electrode 280 also serves to prevent noise from being generated in the touch sensing unit 500 due to electromagnetic waves that are generated in circuit wiring, such as thin film transistors, formed between the first insulation substrate 110 and the second insulation substrate 210. That is, an additional configuration that is only for blocking electromagnetic waves is omitted. Even with this configuration described above, the panel assembly 906 can perform an input function by which external signals are input as well as a display function by which images are displayed. That is, even with a structure in which the color filter 230 is formed in the second display panel 200, it is possible to provide the panel assembly 906 having an input function. In addition, since the additional configuration for blocking electromagnetic waves is omitted, it is possible to simplify the entire configuration and the manufacturing process.

Figure 15:
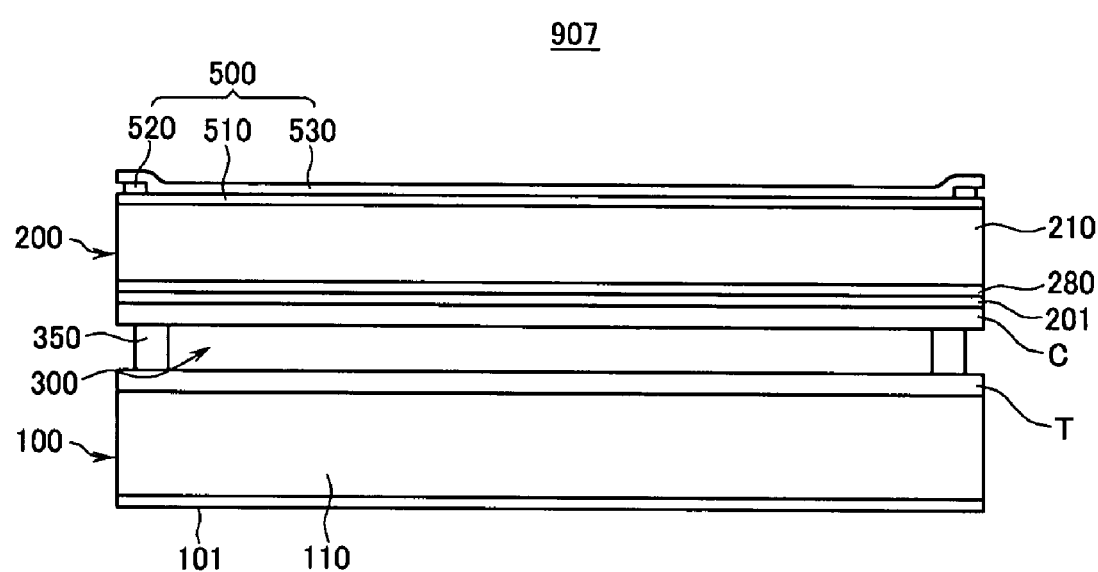
FIG. 15 is a cross-sectional view illustrating a panel assembly according to a seventh exemplary embodiment of the present invention.
Figure 16:
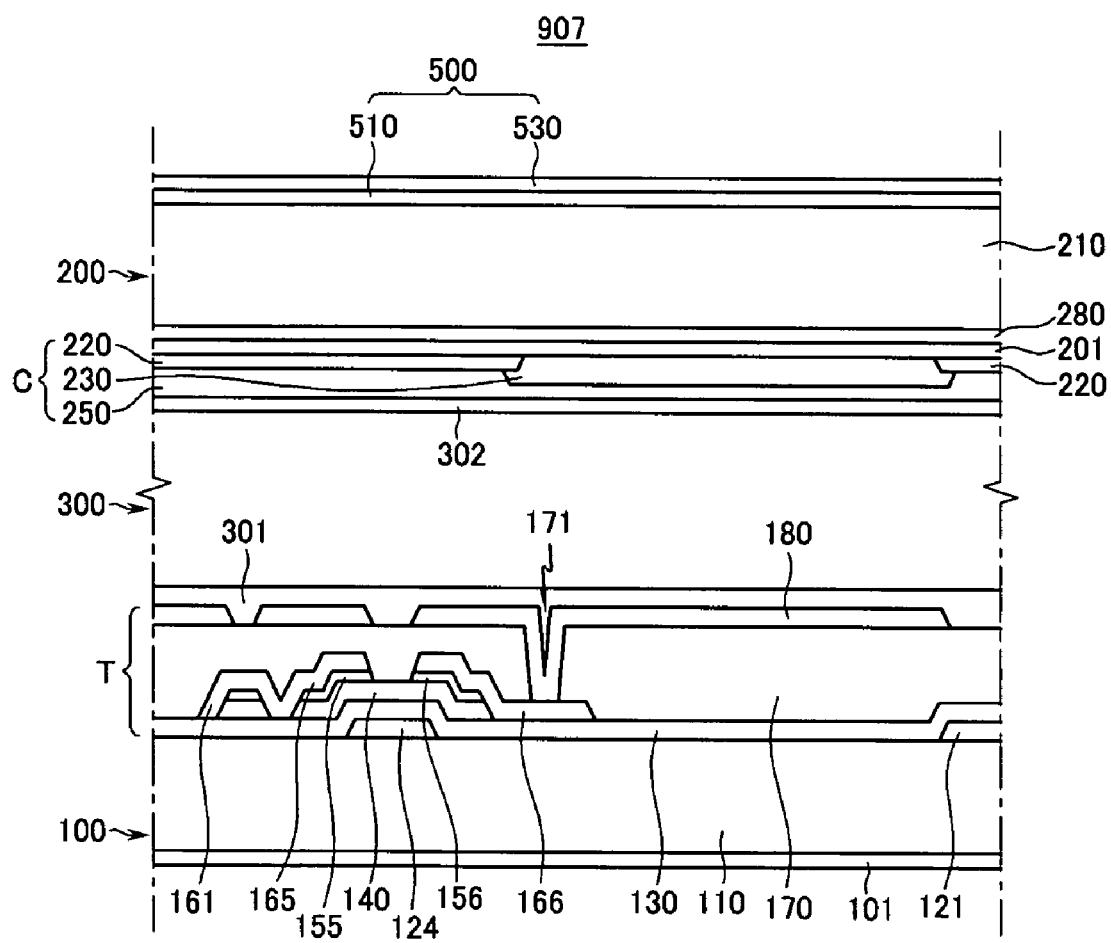
FIG. 16 is a partially enlarged sectional view illustrating the panel assembly shown in FIG. 15.

Hereinafter, a seventh exemplary embodiment of the present invention will be described with reference to FIGS. 15 and 16. FIG. 15 is a cross-sectional view illustrating a panel assembly 907, and FIG. 16 is an enlarged sectional view illustrating main parts of the panel assembly 907 for detailed description thereof. The panel assembly 907 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. Here, the first display panel 100 serves as a rear substrate, and the second display panel 200 serves as a front substrate. The first display panel 100 includes a first insulation substrate 110 and a thin film transistor forming layer T that is formed on the first insulation substrate 110. Here, the thin film transistor forming layer T is formed on a surface of the first insulation substrate 110 facing a second insulation substrate 210. In addition, the first display panel 100 further includes pixel electrodes 180 connected to thin film transistors. The second display panel 200 includes the second insulation substrate 210, and a touch sensing unit 500, a common electrode 280, and a color filter forming layer C that are formed on the second insulation substrate 210. Here, the common electrode 280 and the color filter forming layer C are formed on a surface of the second insulation substrate 210 facing the first insulation substrate 110, and the touch sensing unit 500 is formed on the other surface of the second insulation substrate 210 on which the common electrode 280 is not formed. In addition, the common electrode 280 is disposed between the second insulation substrate 210 and the color filter forming layer C. The color filter forming layer C includes a color filter 230, a light blocking member 220, and a planarizing layer 250.

The panel assembly 907 further includes a first polarization layer 101 disposed on a rear surface of the first insulation substrate 110, that is, a surface of the first insulation substrate 110 not facing the second insulation substrate 210, and a second polarization layer 201 disposed between the common electrode 280 and the color filter forming layer C. The first polarization layer 101 and the second polarization layer 201 are disposed such that light is cross-polarized. At this time, the first polarization layer 101 serves to polarize light incident on the panel assembly 907, and the second polarization layer 201 serves as an analyzer. Furthermore, the common electrode 280 according to the seventh exemplary embodiment of the present invention and a pixel electrode 180 of the first display panel 100 form an electric field by which liquid crystal molecules are driven, and the common electrode 280 also serves to prevent noise from being generated in the touch sensing unit 500 due to electromagnetic waves that are generated in circuit wiring, such as thin film transistors, formed between the first insulation substrate 110 and the second insulation substrate 210. That is, an additional configuration that is only for blocking electromagnetic waves is omitted. Even with this configuration described above, the panel assembly 907 can perform an input function by which external signals are input as well as a display function by which images are displayed. That is, even with a structure in which the color filter 230 is formed in the second display panel 200, it is possible to provide the panel assembly 907 having an input function. In addition, since the additional configuration for blocking electromagnetic waves is omitted, it is possible to simplify the entire configuration and the manufacturing process. In addition, it is possible to improve the effects of blocking electromagnetic waves by disposing the common electrode 280 as close to the touch sensing unit 500 as possible.

Figure 17:
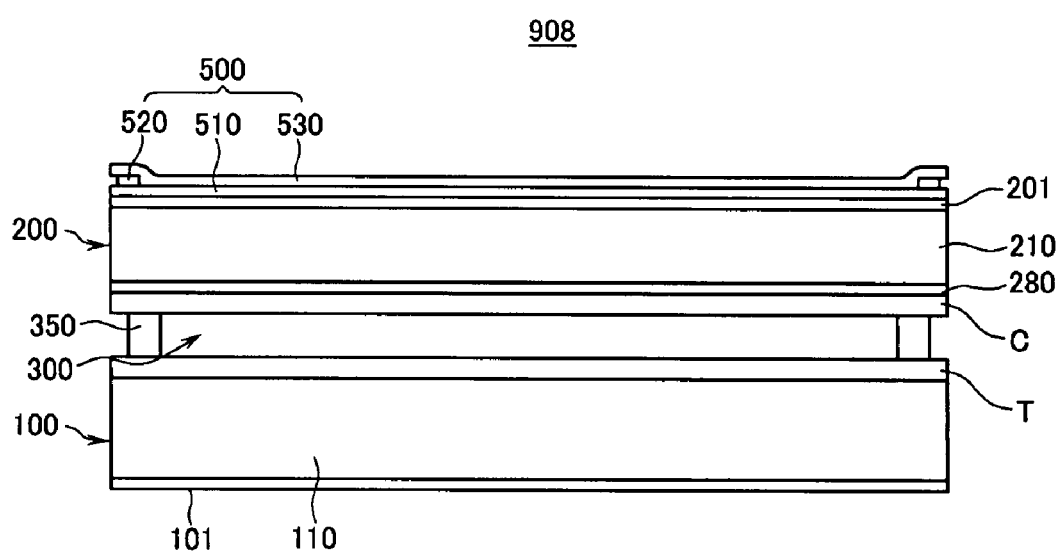
FIG. 17 is a cross-sectional view illustrating a panel assembly according to an eighth exemplary embodiment of the present invention.
Figure 18:
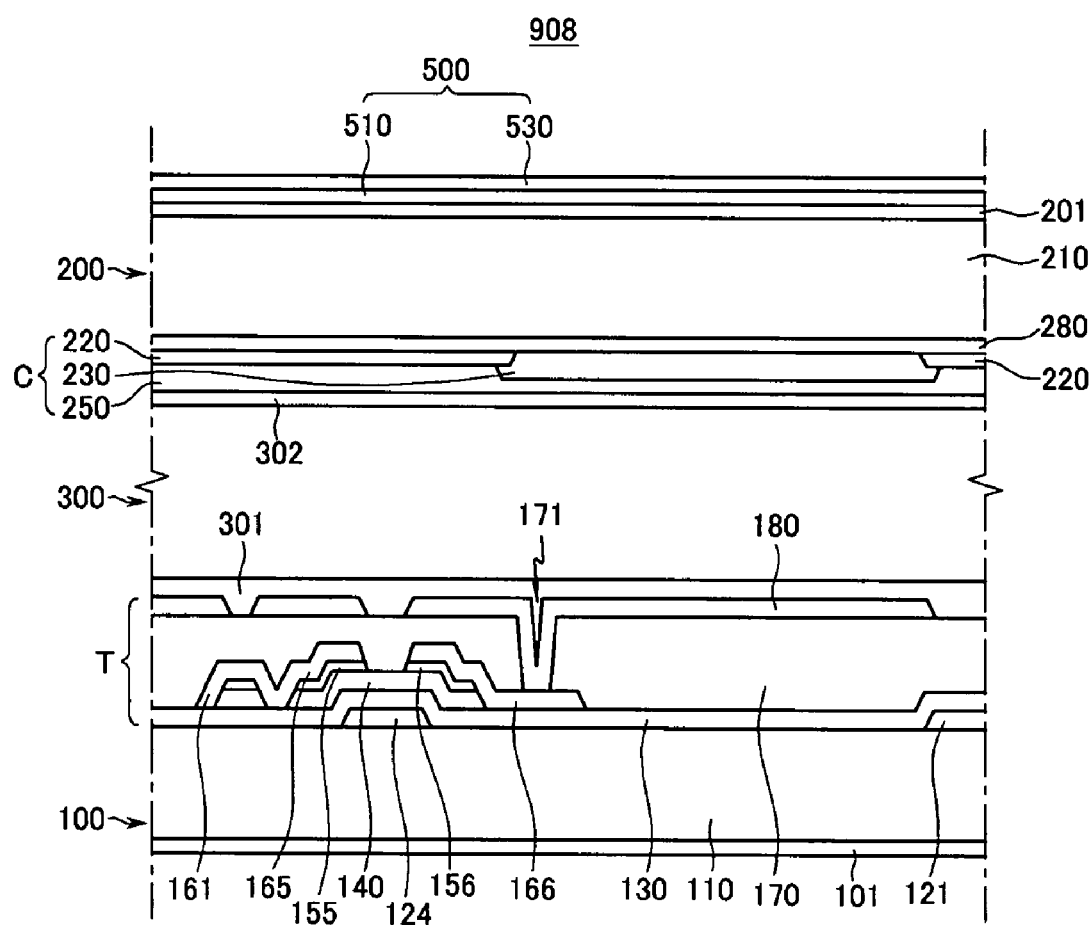
FIG. 18 is a partially enlarged sectional view illustrating the panel assembly shown in FIG. 17.

Hereinafter, an eighth exemplary embodiment of the present invention will be described with reference to FIGS. 17 and 18. FIG. 17 is a cross-sectional view illustrating a panel assembly 908, and FIG. 18 is an enlarged sectional view illustrating main parts of the panel assembly 908 for detailed description thereof. The panel assembly 908 includes a first display panel 100, a second display panel 200 opposite to the first display panel 100, and a liquid crystal layer 300 having liquid crystal molecules interposed between the first display panel 100 and the second display panel 200. The first display panel 100 and the second display panel 200 are bonded to each other by a sealant 350. Here, the first display panel 100 serves as a rear substrate, and the second display panel 200 serves as a front substrate. The first display panel 100 includes a first insulation substrate 110 and a thin film transistor forming layer T that is formed on the first insulation substrate 110. Here, the thin film transistor forming layer T is formed on a surface of the first insulation substrate 110 facing a second insulation substrate 210. The first display panel 100 further includes pixel electrodes 180 connected to thin film transistors. The second display panel 200 includes the second insulation substrate 210, and a touch sensing unit 500, a common electrode 280, and a color filter forming layer C that are formed on the second insulation substrate 210. Here, the common electrode 280 and the color filter forming layer C are formed on a surface of the second insulation substrate 210 facing the first insulation substrate 110, and the touch sensing unit 500 is formed on the other surface of the second insulation substrate 210 on which the common electrode 280 is not formed. Furthermore, the common electrode 280 is disposed between the second insulation substrate 210 and the color filter forming layer C. The color filter forming layer C includes a color filter 230, a light blocking member 220, and a planarizing layer 250.

The panel assembly 908 also includes a first polarization layer 101 disposed on a rear surface of the first insulation substrate 110, that is, a surface of the first insulation substrate 110 not facing the second insulation substrate 210, and a second polarization layer 201 disposed on a front surface of the second insulation substrate 210, that is, a surface of the second insulation substrate 210 not facing the first insulation substrate 110. The second polarization layer 201 is disposed between the second insulation substrate 210 and the touch sensing unit 500. That is, the second polarization layer 201 is disposed between the second insulation substrate 210 and an electrostatic induction insulating layer 510 of the touch sensing unit 500. The first polarization layer 101 and the second polarization layer 201 are disposed such that light is cross-polarized. At this time, the first polarization layer 101 serves to polarize light incident on the panel assembly 908, and the second polarization layer 201 serves as an analyzer. Furthermore, the common electrode 280 according to the eighth exemplary embodiment of the present invention and a pixel electrode 180 of the first display panel 100 form an electric field by which liquid crystal molecules are driven, and the common electrode 280 also serves to prevent noise from being generated in the touch sensing unit 500 due to electromagnetic waves that are generated in circuit wiring, such as thin film transistors, formed between the first insulation substrate 110 and the second insulation substrate 210. That is, an additional configuration that is only for blocking electromagnetic waves is omitted. Even with this configuration described above, the panel assembly 908 can perform an input function by which external signals are input as well as a display function by which images are displayed. That is, even with a structure in which the color filter 230 is formed in the second display panel 200, it is possible to provide the panel assembly 908 having an input function.

In addition, since the additional configuration for blocking electromagnetic waves is omitted, it is possible to simplify the entire configuration and manufacturing process. Further, it is possible to improve the effects of blocking electromagnetic waves by disposing the common electrode 280 as close to the touch sensing unit 500 as possible. Also, since the second polarization layer 201 is disposed at the location other than a portion between the second insulation substrate 210 and the first insulation substrate 110, the second polarization layer 201 can be made of various materials. As a result, the second polarization layer 201 can be more economically manufactured. As described above, according to the present invention, the panel assembly can perform an input function by which external signals are input as well as a display function by which images are displayed. Further, a separate process of forming the touch sensing unit is not performed, but rather the touch sensing unit is simultaneously formed in a process of manufacturing the panel assembly. Thus, it is possible to improve productivity in manufacturing the panel assembly having the input function. Furthermore, it is possible to maximize the effective display area of the panel assembly and minimize deterioration of quality of images displayed by the panel assembly having the input function. Further, it is possible to prevent defects due to, for example, degradation of light characteristics of the touch sensing unit. Since the additional configuration for blocking electromagnetic waves is omitted, it is further possible to simplify the entire configuration and the manufacturing process. In addition, it is possible to improve the effects of blocking electromagnetic waves by disposing the common electrode as close to the touch sensing unit as possible.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A panel assembly, comprising:
a first display panel having a first insulation substrate;
a second display panel having a second insulation substrate that holds an electro-optical active layer with the first display panel, the electro-optical active layer comprising a liquid crystal layer or an organic luminescent layer; and
a touch sensing unit formed on a surface of the second insulation substrate such that the second insulation substrate is the closest substrate to the touch sensing unit,
wherein the touch sensing unit comprises:
an electrostatic induction insulating layer formed on the second insulation substrate;
an electrostatic induction pattern layer formed on the electrostatic induction insulating layer along edges of the electrostatic induction insulating layer; and
a dielectric layer that covers the electrostatic induction insulating layer and the electrostatic induction pattern layer,
wherein the touch sensing unit has no insulation substrate, and
wherein the second display panel comprises:
a common electrode formed on a surface of the second insulation substrate facing the first insulation substrate, and
a second polarization layer disposed between the common electrode and the second insulation substrate.

2. The panel assembly of claim 1, wherein the electrostatic induction pattern layer is made of at least one of silver (Ag), chromium (Cr), aluminum (Al), and indium tin oxide (ITO).

3. The panel assembly of claim 2, wherein the electrostatic induction pattern layer comprises:
an electrostatic induction portion in which a plurality of conductive patterns electrically separated from one another are formed along the edges of the electrostatic induction insulating layer, and
a power connection portion connected to an edge of the electrostatic induction portion so as to supply power.

4. The panel assembly of claim 1, wherein each of the electrostatic induction insulating layer and the dielectric layer is made of at least one of silicon dioxide ($SiO_2$), silicon nitride ($Si_3N_4$), alumina ($Al_2O_3$), and antimony tin oxide (ATO).

5. The panel assembly of claim 1, wherein the first display panel comprises a plurality of thin film transistors, a plurality of pixel electrodes, and a color filter that are formed on a surface of the first insulation substrate facing the second insulation substrate.

6. The panel assembly of claim 5, further comprising an electromagnetic wave shield layer disposed between the electrostatic induction insulating layer and the second insulation substrate.

7. The panel assembly of claim 6, wherein the electromagnetic wave shield layer includes a transparent conductive material.

8. The panel assembly of claim 5, further comprising a first polarization layer disposed on the common electrode.

9. The panel assembly of claim 5, further comprising a third polarization layer disposed between the electrostatic induction insulating layer and the second insulation substrate.

10. The panel assembly of claim 1, wherein the first display panel comprises a plurality of thin film transistors and pixel electrodes that are formed on a surface of the first insulation substrate facing the second insulation substrate, and
the second display panel comprises a color filter and a common electrode formed on a surface of the second insulation substrate facing the first insulation substrate.

11. The panel assembly of claim 10, wherein the color filter is disposed between the second insulation substrate and the common electrode.

12. The panel assembly of claim 11, further comprising an electromagnetic wave shield layer disposed between the electrostatic induction insulating layer and the second insulation substrate.

13. The panel assembly of claim 12, wherein the electromagnetic wave shield layer includes a transparent conductive material.

14. The panel assembly of claim 11, further comprising a first polarization layer disposed between the color filter and the second insulation substrate.

15. The panel assembly of claim 11, further comprising a second polarization layer disposed between the electrostatic induction insulating layer and the second insulation substrate.

16. The panel assembly of claim 10, wherein the common electrode is disposed between the second insulation substrate and the color filter.

17. The panel assembly of claim 16, further comprising a first polarization layer disposed between the common electrode and the second insulation substrate.

18. The panel assembly of claim 16, further comprising a second polarization layer disposed between the color filter and the common electrode.

19. The panel assembly of claim 16, further comprising a third polarization layer disposed between the electrostatic induction insulating layer and the second insulation substrate.

20. The panel assembly of claim 1, wherein the liquid crystal layer is interposed between the first display panel and the second display panel.

* * * * *